(12) United States Patent
Ashkenazi et al.

(10) Patent No.: US 12,105,292 B2
(45) Date of Patent: *Oct. 1, 2024

(54) OPTICAL SEE THROUGH (OST) NEAR EYE DISPLAY (NED) SYSTEM INTEGRATING OPHTHALMIC CORRECTION

(71) Applicant: EVERYSIGHT LTD., Haifa (IL)

(72) Inventors: Asaf Ashkenazi, Haifa (IL); Hanan Shamir, Haifa (IL)

(73) Assignee: EVERYSIGHT LTD., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,218

(22) Filed: Oct. 28, 2022

(65) Prior Publication Data

US 2023/0118315 A1 Apr. 20, 2023

Related U.S. Application Data

(63) Continuation of application No. 16/424,159, filed on May 28, 2019, now Pat. No. 11,513,349, which is a continuation-in-part of application No. 14/632,310, filed on Feb. 26, 2015, now Pat. No. 10,488,660, which is a continuation-in-part of application No. 12/862,987, filed on Aug. 25, 2010, now Pat. No. 8,970,962, which is a continuation of application No.
(Continued)

(51) Int. Cl.
*G02B 27/01* (2006.01)

(52) U.S. Cl.
CPC .. *G02B 27/0172* (2013.01); *G02B 2027/0132* (2013.01)

(58) Field of Classification Search
CPC .................................................. G02B 27/0172
USPC .............................................................. 359/631
See application file for complete search history.

(56) References Cited

U.S. PATENT DOCUMENTS

| | | | | |
|---|---|---|---|---|
| 5,416,876 A | * | 5/1995 | Ansley | G02B 27/0172 385/116 |
| 5,726,671 A | * | 3/1998 | Ansley | G02B 5/12 348/E5.145 |
| 6,353,503 B1 | | 3/2002 | Spitzer | |

(Continued)

FOREIGN PATENT DOCUMENTS

| | | |
|---|---|---|
| FR | 3017966 | 2/2018 |
| KR | 20110005741 | 6/2016 |

*Primary Examiner* — James R Greece
(74) *Attorney, Agent, or Firm* — K&L Gates LLP

(57) ABSTRACT

An optical see-through (OST) near-eye display (NED) system is presented, integrating ophthalmic correction for an eye of a user, comprising a partially transmissive partially reflective lens, including an inner surface characterized by an inner surface radius of curvature exhibiting a first optical power, and an outer surface characterized by an outer surface radius of curvature exhibiting a second optical power, said partially transmissive partially reflective lens is configured to be facing said eye, and to at least partially transmit incoming light of an outward scene to said eye; and an electro-optical unit, configured to be optically coupled with said partially transmissive partially reflective lens, and including a light display configured to project a light beam image onto said inner surface, so to enable reflection of said light beam image toward said eye, said electro-optical unit is configured to be located at a glabellar region of said user.

18 Claims, 12 Drawing Sheets

Related U.S. Application Data

12/404,087, filed on Mar. 13, 2009, now Pat. No. 7,791,809.

(60) Provisional application No. 61/036,281, filed on Mar. 13, 2008.

(56) References Cited

U.S. PATENT DOCUMENTS

| | | | |
|---|---|---|---|
| 6,445,362 B1 * | 9/2002 | Tegreene | G02B 26/0841 |
| | | | 345/530 |
| 7,401,920 B1 * | 7/2008 | Kranz | G02B 27/0093 |
| | | | 382/117 |
| 2017/0206657 A1 * | 7/2017 | Nozato | G06T 7/20 |
| 2019/0278088 A1 * | 9/2019 | Asaf | G02B 27/017 |
| 2022/0229300 A1 * | 7/2022 | Ashkenazi | G02B 17/08 |

* cited by examiner

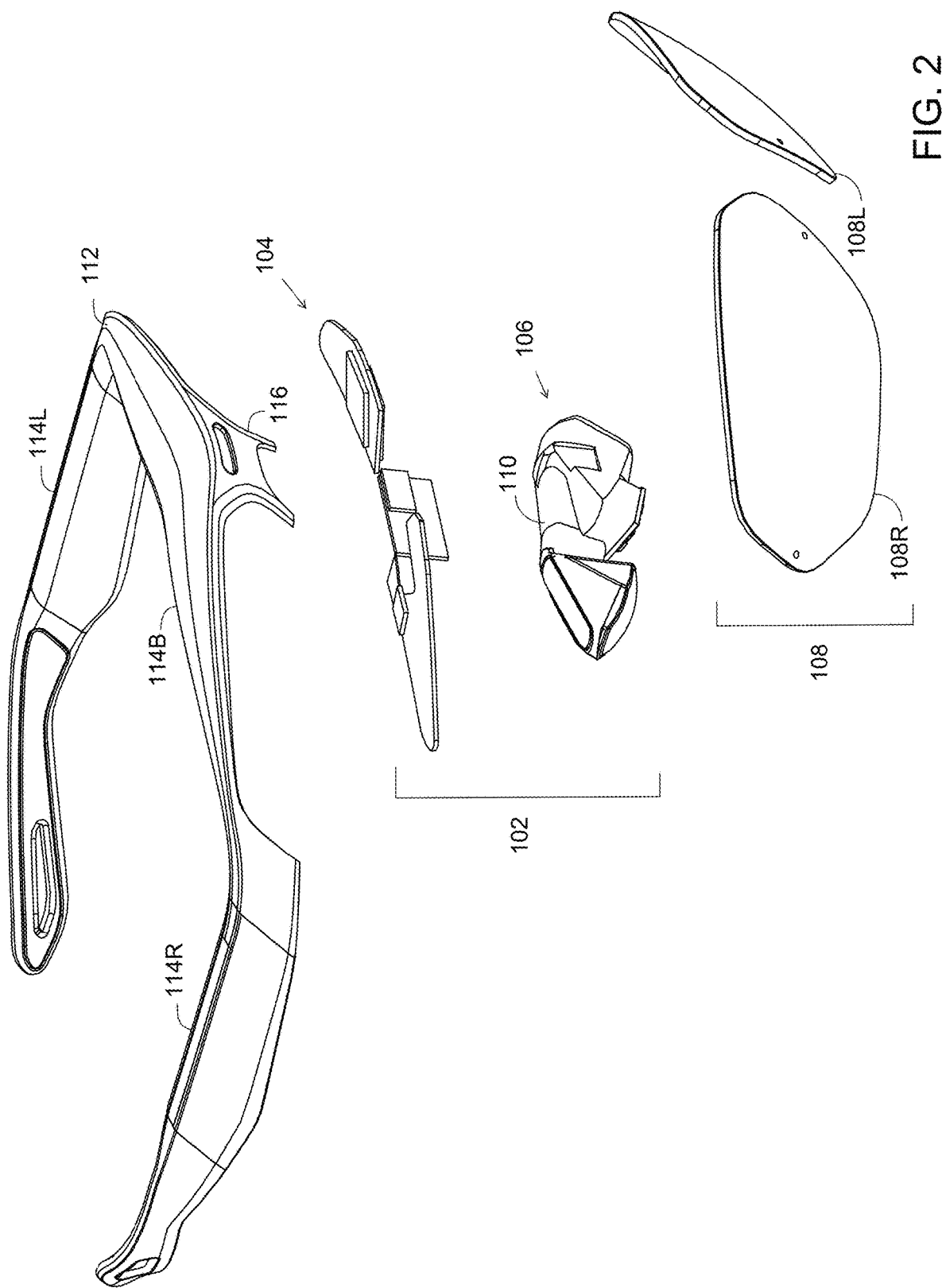

OPTICAL SEE THROUGH (OST) NEAR EYE DISPLAY (NED) SYSTEM INTEGRATING OPHTHALMIC CORRECTION

REFERENCE TO RELATED APPLICATIONS

This application is a continuation and claims priority to U.S. application Ser. No. 16/424,159, titled "Optical See-Through (OST) Near-Eye Display (NED) System Integrating Ophthalmic Correction", and filed May 28, 2019, allowed, which is a continuation in part of and claims priority to U.S. application Ser. No. 14/632,310, titled "Wearable Optical Display System for Unobstructed Viewing", and filed Feb. 26, 2015, issued as 10,488,660, which is a continuation in part of and claims priority to U.S. Ser. No. 12/862,987, titled "Visor Heads-Up Display" and filed Aug. 25, 2010, issued as 8,970,962, which claims priority to U.S. application Ser. No. 12/404,087, titled "Visor Heads-Up Display" and filed Mar. 13, 2009, issued as U.S. Pat. No. 7,791,809, which claims priority to U.S. Provisional Application No. 61/036,281, titled "Visor Heads-Up Display" and filed Mar. 13, 2008, now expired. This application claims priority to all of those prior applications, and incorporates herein the disclosures thereof by reference.

FIELD OF THE DISCLOSED TECHNIQUE

The disclosed technique relates to optical systems in general, and to wearable optical display systems, in particular.

BACKGROUND OF THE DISCLOSED TECHNIQUE

U.S. Patent Application Publication No.: US 2015/0168730 A1 to Ashkenazi et al. is directed at a user wearable optical display system that provides information in the form of projected light to a user who wears the system without obstructing the user's field of regard (FOR). The user wearable optical display system includes a user attachment section, a partially transmissive partially reflective lens, and an electro-optical unit. The user attachment section is for detachably mounting the user wearable optical display system to a head of a user. The partially transmissive partially reflective lens, which is coupled with the user attachment section, is configured to be facing at least one eye of the user. The electro-optical unit is coupled with at least one of the user attachment section and the partially transmissive partially reflective lens. The electro-optical unit includes a processor, and a light projection unit. The processor is coupled with the light projection unit. The light projection unit is configured to transmit light beams onto the partially transmissive partially reflective lens. The electro-optical unit is configured to be positioned with respect to the user attachment section such that when the user wearable optical display system is mounted on the user, the electro-optical unit is located at the glabellar region of the user.

SUMMARY OF THE PRESENT DISCLOSED TECHNIQUE

It is an object of the disclosed technique to provide a novel optical see-through (OST) near-eye display (NED) system, integrating ophthalmic (vision) correction for an eye of a user. The OST NED system includes a partially transmissive partially reflective lens, and an electro-optical unit. The partially transmissive partially reflective lens includes an inner surface characterized by an inner surface radius of curvature exhibiting a first optical power, and an outer surface characterized by an outer surface radius of curvature exhibiting a second optical power. The partially transmissive partially reflective lens is configured to be facing the eye of the user, and to at least partially transmit incoming light of an outward scene to the eye. The electro-optical unit is configured to be optically coupled with the partially transmissive partially reflective lens. The electro-optical unit includes a light display configured to project a light beam image onto the inner surface, so to enable reflection of the light beam image toward the eye. The electro-optical unit is configured to be located at a glabellar region of the user. The first optical power is configured to provide ophthalmic correction with respect to reflected light beam image for viewing by the eye, wherein the second optical power is configured to provide ophthalmic correction with respect to transmitted incoming light from the outward scene for viewing by the eye.

In accordance with another embodiment of the disclosed technique there is provided an optical configuration for an optical see-through (OST) eye-tracking system. The optical configuration includes a partially transmissive partially reflective lens, and an electro-optical unit (sub-system). The partially transmissive partially reflective lens is configured to be facing an eye of a user. The electro-optical unit (sub-system) includes an image sensor, configured to acquire at least one image of an eyeball feature of the eye with reflected light from the eye; a first lens; a second lens; a third lens; a fourth lens; a curved mirror; an optical combiner; and a fifth lens. The optical configuration enables the reflected light to travel along an optical path at least partially reflecting from the partially transmissive partially reflective lens, then refracting through the first lens, the second lens, the third lens, and the fourth lens, then reflecting from the curved mirror and refracting again in reverse order through the fourth lens and then through the third lens, then at least partially passing through the optical combiner, refracting through the fifth lens, and impinging on the image sensor.

BRIEF DESCRIPTION OF THE DRAWINGS

The disclosed technique will be understood and appreciated more fully from the following detailed description taken in conjunction with the drawings in which:

FIG. 2 is a schematic illustration of the OST NED system of FIG. 1 in an exploded view;

DETAILED DESCRIPTION OF THE EMBODIMENTS

The disclosed technique overcomes the disadvantages of the prior art by providing a free-space optical see-through (OST) near-eye display (NED) system integrating ophthalmic correction for an eye of a user of the system. The OST NED system includes a partially transmissive partially reflective lens, and an electro-optical unit. The partially transmissive partially reflective lens includes an inner surface, and an outer surface. The inner surface is characterized by an inner surface radius of curvature exhibiting a first optical power, and an outer surface characterized by an outer surface radius of curvature exhibiting a second optical power. The partially transmissive partially reflective lens is configured to be facing an eye of the user, and further configured to at least partially transmit incoming light of an outward scene to that eye. The electro-optical unit is configured to be optically coupled with the partially transmissive partially reflective lens. The electro-optical unit includes a light display configured to project a light beam image onto the inner surface, so as to enable reflection of the light beam image toward the eye. The electro-optical unit is configured to be located at a glabellar region of the user. The first optical power of the inner surface is configured to provide ophthalmic correction with respect to the reflected light beam image for viewing by the eye, and the second optical power is configured to provide ophthalmic correction with respect to transmitted incoming light from the outward scene for viewing by the eye.

According to another aspect of the disclosed technique, there is thus provided a free-space optical configuration for an OST eye-tracking system that includes a partially transmissive partially reflective lens, and an electro-optical sub-system. The electro-optical sub-system includes an images sensor, a first lens, a second lens, a third lens, a fourth lens, a curved mirror, an optical combiner, and a fifth lens. The partially transmissive partially reflective lens is configured to be facing an eye of a user. The image sensor is configured to acquire at least one image of an eyeball feature of the eye with reflective light from the eye. The optical configuration enables reflected the reflected light to travel along an optical path at least partially reflecting from the partially transmissive partially reflective lens, then refracting through the first lens, the second lens, the third lens, the fourth lens, then reflecting from the curved mirror and refracting again in reverse order through the fourth lens and then through the third lens, then at least partially passing through the optical combiner, refracting through the fifth lens, and impinging on the image sensor.

Figure 1:
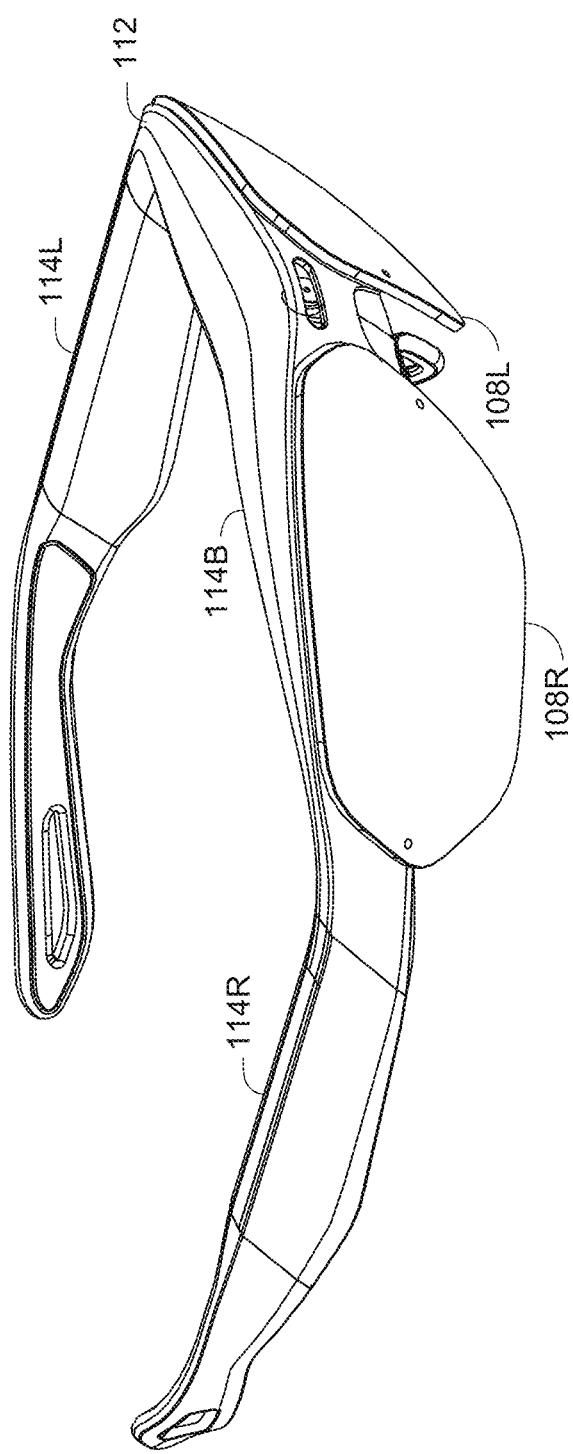
FIG. 1 is a schematic illustration of an optical see-through (OST) near-eye display (NED) system, integrating ophthalmic correction for an eye of a user, constructed and operative in accordance an embodiment of the disclosed technique.

Reference is now made to FIGS. 1 and 2. FIG. 1 is a schematic illustration of an optical see-through (OST) near-eye display (NED) system, integrating ophthalmic correction for an eye of a user, generally referenced 100, constructed and operative in accordance an embodiment of the disclosed technique. FIG. 2 is a schematic illustration of the OST NED system of FIG. 1 in an exploded view. OST NED system 100 includes an electro-optical unit 102 and at least one partially transmissive partially reflective lens 108. Electro-optical unit 102 includes an electronics module 104 (FIG. 2), and an optical module 106. Optical module 106 is configured to be at least partially housed in an optical housing 110 (FIG. 2). Electro-optical unit 102 is configured to be mechanically and optically coupled such to have fixed position and orientation with respect to at least one partially transmissive partially reflective lens 104 (i.e., and vice-versa).

FIGS. 1 and 2 show a user attachment section 112 that enables the detachable coupling of OST NED system 100 to a user (i.e., to be worn by a user). User attachment section 112 is typically embodied in the form of a frame (e.g., resembling eye glasses) and includes two temples 114R and 114L (interchangeably "stem portions"), a bridge 114B ("bridge portion") that couples between stem portions 114L and 114R, and a nosepiece 116. The terms "user attachment section" and "frame" are herein interchangeable and refer to a device, object or group of objects configured and operative to couple with a wearer of OST NED system 100. FIGS. 1 and 2 illustrate two partially transmissive partially reflective lenses, namely, a partially transmissive partially reflective lens 108R (denoted interchangeably herein simply "lens", "combiner", "optical combiner"), and partially transmissive partially reflective lens 108L, each configured to be facing a different eye of a user wearing OST NED system 100.

Figure 3B:
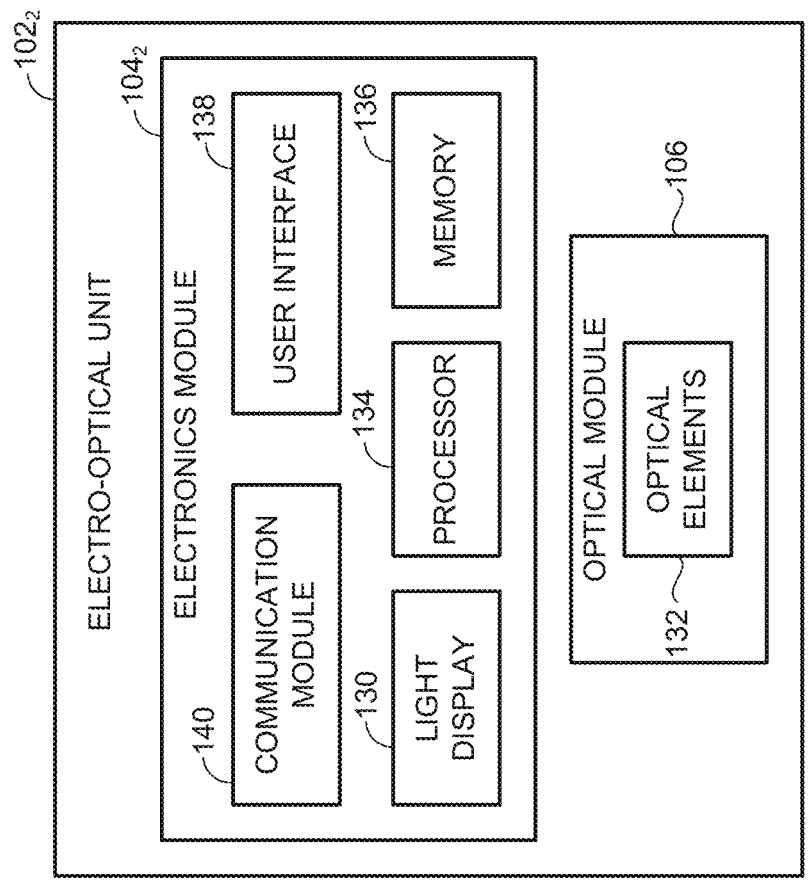
FIG. 3B is a schematic block diagram of an accessorized configuration of the electro-optical unit of OST NED system, constructed and operative in accordance with the embodiment of the disclosed technique.
Figure 3A:
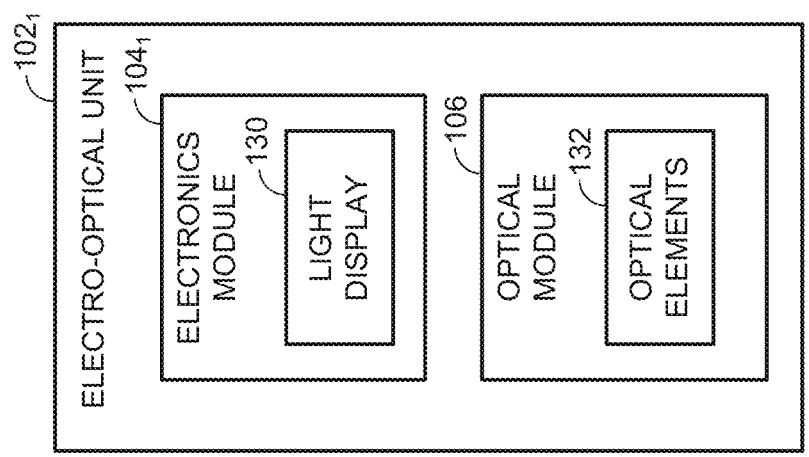
FIG. 3A is a schematic block diagram of a basic configuration of the electro-optical unit of OST NED system, constructed and operative in accordance with the embodiment of the disclosed technique.
Figure 4:
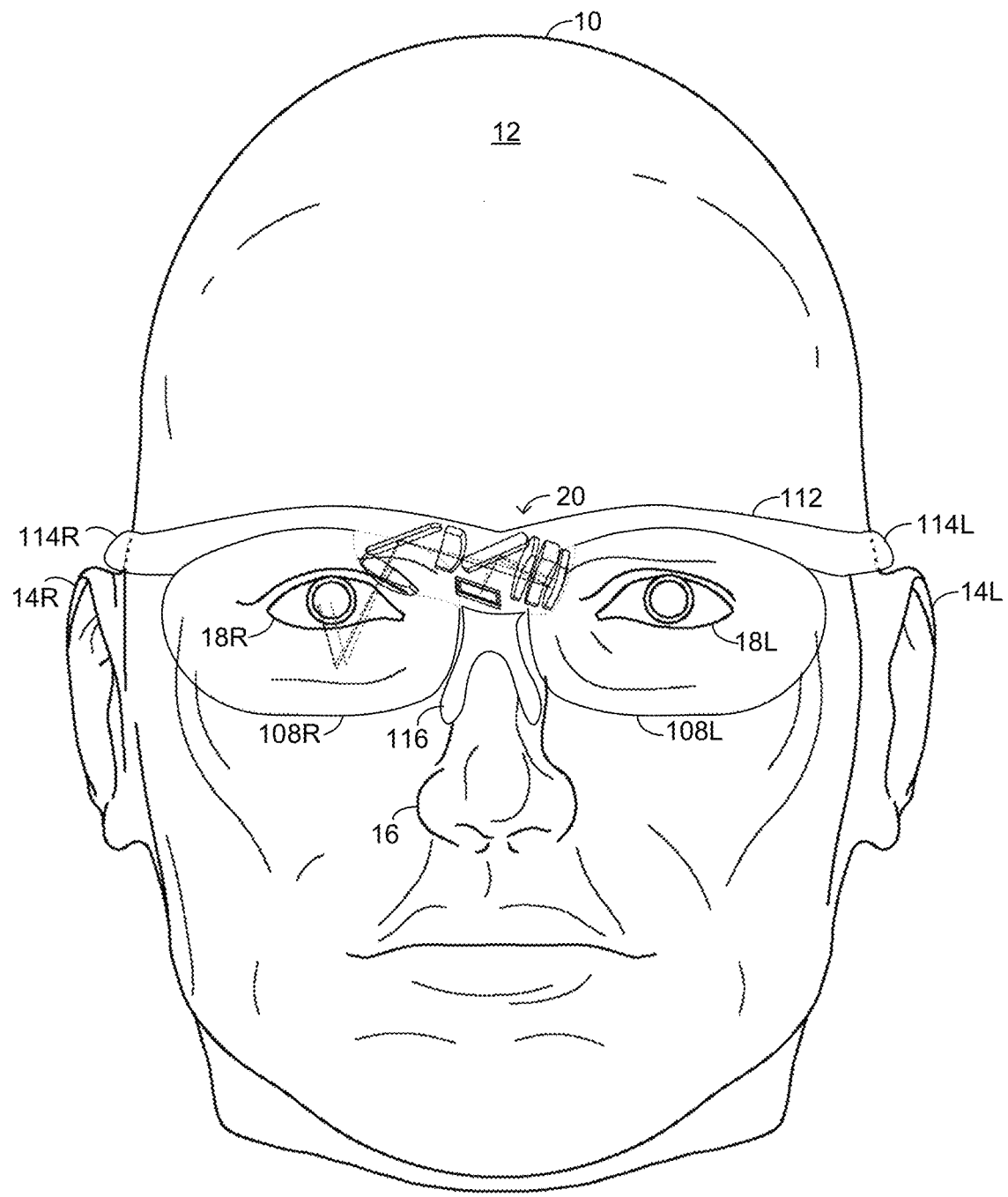
FIG. 4 is a schematic illustration showing OST NED system of FIGS. 1 and 2 in a mounted configuration on a user.
Figure 5:
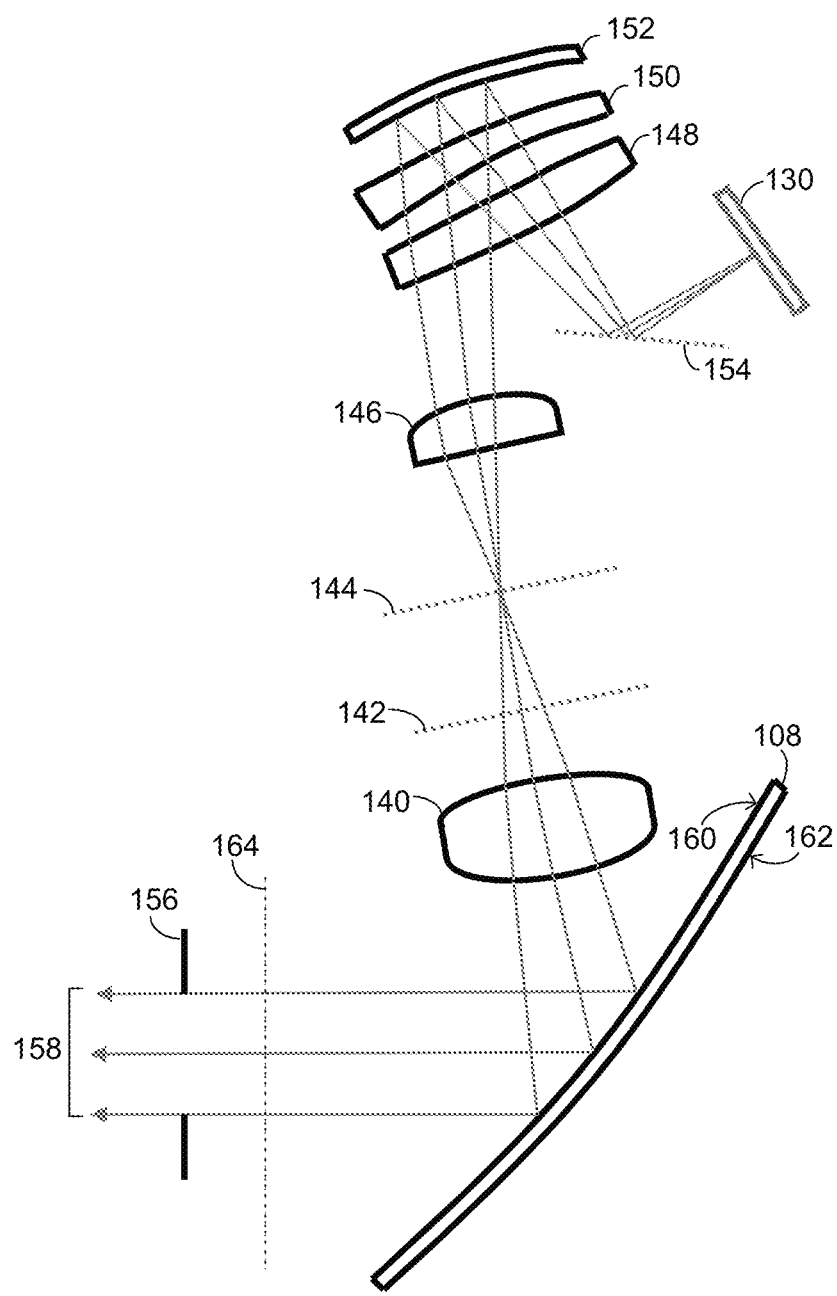
FIG. 5 is a schematic diagram of a light path through an optical module of electro-optical unit of OST, constructed and operative in accordance with the embodiment of the disclosed technique.

Reference is now further made to FIGS. 3A, 3B, 4, and 5. FIG. 3A is a schematic block diagram of a basic configuration of the electro-optical unit of OST NED system, constructed and operative in accordance with the embodiment of the disclosed technique. FIG. 3B is a schematic block diagram of an accessorized configuration of the electro-optical unit of OST NED system, constructed and operative in accordance with the embodiment of the disclosed technique. FIG. 4 is a schematic illustration showing OST NED system of FIGS. 1 and 2 in a mounted configuration on a user. FIG. 5 is a schematic diagram of a light path through an optical module of electro-optical unit of OST, constructed and operative in accordance with the embodiment of the disclosed technique. FIG. 3A illustrates a basic configuration of electro-optical unit 102 of OST NED system 100, denoted by 102$_1$. Electro-optical unit 102$_1$ includes an electronics module 1041, and optical module 106. Electronics module 1041 includes an light display 130. Optical module 106 includes optical elements, collectively referenced 132 that are particularized in greater detail in FIG. 5. Light display 130 of electronics module 1041 along with optical elements 132 of optical module 106 form a light projector that is configured and operative to produce, irradiate, and project a light beam image (not shown) onto at least one partially transmissive partially reflective lens 108 (i.e., at least one of 108R and 108L). Optical elements 132 are configured and operative to convey and project the image produced by light display 130 onto partially transmissive partially reflective lens 108, as will be described in greater detail below in conjunction with FIGS. 4 and 5.

FIG. 3B illustrates an accessorized configuration of electro-optical unit 102 of OST NED system 100, denoted by 102$_2$, having additional components with respect to the basic configuration of electro-optical unit configuration 102$_1$, shown in FIG. 3A. Electro-optical unit 102 includes an electronics module 1042, and optical module 106 (i.e., identical to that in FIG. 3A). According to the accessorized configuration, electronics module 1042 includes light display 130 (i.e., identical to that in FIG. 3A), and may optionally include at least one of a processor 134, a memory device 136, a user interface 138, and a communication module 140. Processor 134 is configured and operative to be communicatively coupled (i.e., wired, wirelessly thereby enabling to at least one of send and receive signals and data) to light display 130, memory device 136, user interface 138, and communication module 140 (interconnections not shown in FIG. 3B). Electro-optical unit 102$_2$ is electrically powered by a power source (not shown). The power source may be embodied in the form of at least one battery that may be housed in user attachment section 112, such as in stem portions 114R and 114L. Alternatively or additionally, solar arrays (not shown) may be integrated with frame 112 and/or with partially transmissive partially reflective lens 108 (e.g., by employing transparent solar arrays, known in the art (e.g., solar window technology)).

With reference to FIG. 4, frame 112 (FIGS. 1 and 2) enables detachable mounting of OST NED 100 system to a head 12 of user 10. Particularly, FIG. 4 shows OST NED system 100 in a mounted configuration on head 12 of user 10 (i.e., being worn). Temples 114R, 114L, and nosepiece 116 are constructed and operative to support OST NED system 100, on the ears 14R, 14L and nose 16 (respectively) of user 10 (FIG. 4). Partially transmissive partially reflective lenses 108R and 108L are coupled with frame 112, and each configured to be facing eyes 18R and 18L (respectively) of user 10 wearing OST NED system 100. Specifically, lens 108R is configured to be facing a right eye 18R, and lens 108L is configured to be facing a left eye 18L of user 10. When OST NED system 100 is in a mounted configuration on user 10, user attachment section 112 is configured to enable electro-optical unit 102 including housing 110 to be positioned within a glabellar region 20 of user's head 12, as shown in FIG. 4. Glabellar region 20 is defined herein as an area covering the glabella (also known as the mesophryon), which, in humans, is an anatomical area between the eyebrows and above the nose 16.

Optical elements (components) 132 (FIGS. 3A and 3B) of optical module 106 as shown in FIG. 4 are further described in greater detail in conjunction with FIG. 5 that illustrates a schematic diagram of a light path through optical module 106 of electro-optical unit 102 of OST NED 100. Electro-optical unit 102 (i.e., 102$_1$ and 102$_2$) includes light display 130, and optical elements 132 of optical module 106 that include a first lens 140 (FIG. 5), a reflector 142, a second lens 146, a third lens 148, a fourth lens 150, a curved mirror 152, and a partially transmissive partially reflective element 154. Further shown in FIG. 5 is partially transmissive partially reflective lens 108, and aperture 156 (herein denoted interchangeably as "light display exit pupil"), and an intermediate image (not shown) that forms at an intermediate image plane 144 between first lens 140 and second lens 146. In general, each partially transmissive partially reflective lens 108 includes an inner surface 160 (herein interchangeably denoted "user-facing surface"), and an outer surface 162 (herein interchangeably denoted "outward-facing surface") Inner surface 160 is characterized by an inner surface radius of curvature $r_i$ exhibiting a first optical power $P_i$. Outer surface 162 is characterized by an outer surface radius of curvature $r_o$ exhibiting a first optical power $P_o$. In a mounted configuration of OST NED system 100 on user 10, inner surface 160 is configured to be facing an eye 14(R,L) of user 10 and outer surface 162 is configured to be facing an outward scene directed away from user 10. Partially transmissive partially reflective lens 108 is configured to at least partially transmit incoming light of an outward scene, impinging on outer surface 162 and exiting from inner surface 160 toward eye 14(R,L) of user 10.

Optical elements 132 of optical module 106, light display 130 of electronics module 104, and partially transmissive partially reflective lens 108 form an optical arrangement (herein interchangeably "optical configuration") allowing light rays to propagate as illustrated in FIGS. 4 and 5. The optical configuration enables light display 130 to project a light beam image (not shown) onto partially transmissive partially reflective lens 108 (i.e., at least one of 108R and 108L) along an optical path represented by light rays 158. Specifically, light display 130 is configured and operative to produce and irradiate the light beam image (i.e., light encoded data defined as light containing data) that propagates along the optical path described as follows. Light display 130 produces the light beam that impinges onto first main reflector 154, which in turn is configured to reflect the light beam toward third lens 148, which in turn is configured to refract the light beam and convey it toward fourth lens 150, which in turn is configured to refract the light beam and convey it toward curved mirror 152. Curved mirror 152 is configured to reflect the light beam back toward fourth lens 150, which in turn is configured to refract the light beam again in reverse order and convey it toward third lens 148. Third lens 148 is configured to refract the light beam and convey it toward second lens 146, which in turn is configured to refract the light beam and convey it toward second auxiliary reflector 142. Second auxiliary reflector 142 is configured to fold the light beam (not shown) and reflect it toward first auxiliary reflector, which in turn is configured to fold the light beam (not shown) and reflect it toward first lens 140. First lens 140 is configured to refract the light beam and convey it toward partially transmissive partially reflective lens 108. Partially transmissive partially reflective lens 108 is configured to reflect the light beam toward at least one eye 18R, 18L of user 10. #

Inner surface 160 of partially transmissive partially reflective lens 108, which is characterized by inner surface radius of curvature ra exhibiting a first optical power $P_i$, is configured to provide ophthalmic correction with respect to the reflected light beam for viewing by at least one eye of the user. Generally, each partially transmissive partially reflective lens $108_1$ and $108_2$ that is associated with a particular eye (i.e., 18R, 18L) of user 10 (i.e., associated in the sense of configured to be facing that eye in a mounted configuration of OST NED system 100), is configured to provide a corresponding ophthalmic correction with respect to its associated eye. The characteristics of each partially transmissive partially reflective lens may be tailored to the specific ophthalmic correction required for each associated eye of the user.

Accordingly, each partially transmissive partially reflective lens $108_1$ and $108_2$ is configured to exhibit its corresponding inner surface radius of curvature $r_{i(1)}$ and $r_{i(2)}$, respectively, and its corresponding first optical power $P_{i(1)}$, $P_{i(2)}$, respectively. Partially transmissive partially reflective lenses $108_1$ and $108_2$ may have the same characteristics (i.e., inner surface radius of curvature, and optical power), or alternatively, different characteristics with respect to each other.

The optical path of the light beams (i.e., exemplified as rays 158 in FIG. 5) originate from light display 130, reflect off partially transmissive partially reflective element 154, pass through lenses 148, 150, reflect from curved mirror 152, pass through (i.e., refract by) lenses 150 and 148 again (i.e., and in reverse order), then pass through lenses 146, and 140, and in due course, reflect from inner surface 160 of partially transmissive partially reflective lens 108 toward an eye (18R, 18L) of user 10. Intermediate image forms along the optical path between first lens 140 and second lens 146, and particularly between auxiliary reflector 142 and second lens 146. Specifically, second lens 146 is configured and operative to be positioned along the optical path and have optical characteristics (e.g., optical power) that allows intermediate image to form at intermediate image plane 144 located perpendicularly along the optical path between itself (second lens 146) and first lens 140. Auxiliary reflector 142 (e.g., fold mirror) facilitates in the minimization of the spatial dimensions of electro-optical unit 102 so that it may substantially meet the spatial constraints of being located substantially at glabellar region 20 of user 10.

In accordance with the disclosed technique, OST NED system 100 is configured and operative to generate and to project light encoded data (i.e., light containing data) in the form of a light representation (e.g., an image, graphical information, symbology, etc.) onto partially transmissive partially reflective lens 108, the latter of which is configured and operative concurrently, to at least partially reflect the light (i.e., which is encoded with data or that contains information) toward the eyes (18R, 18L) of user 10 (FIG. 4, shown as an example for right eye 18R) who wears the system, as well as to at least partially transmit incoming light from a scene in the user's field of regard (i.e., outward-facing environment with respect to the user). Partially transmissive partially reflective lens 108 essentially acts as an optically collimated transparent (or translucent) display enabling the overlay of images and other data projected onto its surfaces (i.e., a combiner), without obstructing a scene viewed by the user.

In accordance with the disclosed technique, OST NED system 100 is configured and operative to generate and to project light encoded data (i.e., light containing data) in the form of a light representation (e.g., an image, graphical information). In the basic configuration shown in FIG. 3A, light display 130 is configured to receive data (e.g., image information from an external source (not shown)) and to generate, irradiate, and project light encoded data in the form of a light representation and to convey the light encoded data toward optical elements 132 of electro-optical unit 102. Alternatively, light display 130 incorporates an internal memory unit (not shown) configured and operative to store data (e.g., image information), which light display 130 uses to generate the light encoded data.

In the accessorized configuration shown in FIG. 3B, processor 134 (FIG. 3B) is configured and operative to produce, process, and modify, data (not shown), for example in the form of electrical signals that convey image data and/or graphical representation data and to provide (communicate) this data to light display 130. Memory device 136 is configured and operative to store this image data for manipulation (e.g., by processing and modification) and for retrieval (e.g., by processor, by light display 130). Memory device 136 is generally embodied in the form of non-volatile memory (e.g., read-only memory (ROM), flash memory, magnetic storage devices (e.g., hard disks), ferroelectric read-only memory (F-RAM), optical memory (e.g., optical discs), etc.) as well as volatile memory (e.g., RAM).

Light display 130 is configured and operative to receive data, generate light encoded data based on the data received therefrom, irradiate and project the light encoded data toward partially transmissive partially reflective element 154. The terms "light encoded data" and "light encoded information" used interchangeably herein, generally refer to light that is encoded with data, and more specifically, to light that contains information that is exhibited in at least one domain, such as in the spectral domain (i.e., wavelengths—colors), in the spatial domain (e.g., in one or multi-dimensions, such as a one-dimensional (1-D) image (e.g., a point, or pixel), a two-dimensional (2-D) image, a three-dimensional (3-D) image), in the temporal domain (e.g., changing—frame rate), in the polarization domain (e.g., by using light polarization encoding techniques), and the like. For example, in case where the encoded data is 2-D color video, the light encoded data that is generated and projected exhibits change in the temporal domain (i.e., as a succession of image frames), in the spatial domain (i.e., as changes in the image space—as in the case of moving objects within the image frames), in the color domain (i.e., representing the different colors of objects in the images), as well in the light intensity domain (i.e., representing, for example the luminance).

Particularly, light display 130 receives data (e.g., externally, from an internal memory device, from processor 134), and generates a collimated light beam (encoded with data) shown representationally in FIG. 5 as a plurality of light rays emanating from light display 130 toward partially transmissive partially reflective element 154. Partially transmissive partially reflective element 154 reflects the light beam toward lens 148, which is typically a convex-concave (meniscus) lens, which in turn refracts this light beam and relays the refracted light beam toward lens 150, the latter of which is optically aligned with respect to lens 148. Lens 150 refracts the refracted light beam relayed from lens 148 and directs the beam toward curved mirror 152, the latter of which is optically aligned with the former. Lens 150 is typically a concave-convex (meniscus) lens, and curved mirror 152 is typically a concave spherical (front surface or alternatively, a rear surface) mirror. Alternatively, mirror 152 may exhibit curvatures other than spherical, such as aspherical, hyberbolic, elliptical, parabolic, toroidal, and the like. The optical elements group (combination) which includes lens 148, lens 150, and curved mirror 152 is constructed and optically arranged to correct aberrations such as astigmatism and distortion that is caused by the optical characteristics such as the curvature of partially transmissive partially reflective lens 108. The refracted light beam arriving from lens 150 impinges curved mirror 152 such that the consequent reflected light beam is directed to pass (again) through lenses 150 and 148, thereby forming an angle with respect to the incoming refracted light beam. The combination of curved mirror 152 and lenses 148 and 150 allow the incoming light beam generated and irradiated from light display 130 to pass (refract) twice through lenses 148 and 150, thereby enabling pre-emptive correction of astigmatism and distortion caused when the light beam reflects off partially transmissive partially reflective lens 108. Generally, in oblique astigmatism, off-axis rays of light from radial and tangential lines in an object plane focus at different distances in the image space. The utilization of lens 148 with lens 150 in the optical arrangement functions to increase the optical power of the optical system by decreasing the overall focal length of optical elements and in effect, enabling a reduction of the physical dimensions of electro-optical unit 102, as well as further enabling fine-tuning for minimizing astigmatism and distortion.

Second lens 146 receives the refracted light beam from third and fourth lenses 148 and 150, refracts and relays the light beam toward first lens 140 in optical module 106. Third and fourth lenses 148 and 150 are typically of biconvex type (although other types may be used, e.g., plano-convex). As mentioned, second lens 146 is optically configured and operative to form intermediate image (not shown) at an intermediate image plane 144 located at a position along an optical path between first lens 140 and second lens 146. Further located at a position along this optical path between first and second lenses 140 and 146 is positioned auxiliary reflector 142 (e.g., a planar folding mirror), which is optically configured and operative to reflect light beams from second lens 146 toward first lens 140, and is employed to bend the optical path into a particular spatial configuration (e.g., required at least for minimizing the spatial dimensions of housing 110 (FIG. 2) of electro-optical unit 102). Minimization of spatial dimensions that is at least partially enabled by bending the light beams of the optical path facilitate in meeting the spatial constraints of housing 110 being located substantially at glabellar region 20 of user 10. The formation of an intermediate image facilitates in the magnification of on outputted generated image, as well as in the widening of the field of view (FOV) that is presented to the user. The formed intermediate image is an aberration-compensated image (or aberration-corrected image) owing to the optical arrangement (and optical characteristics) of curved mirror 152 and lenses 148 and 150. This aberration-compensated formed intermediate image forestalls aberrations produced, at least partially, by the curvature of partially transmissive partially reflective lens 108, such that light rays incident upon and reflecting therefrom are aberration-corrected.

Partially transmissive partially reflective lens 108 is constructed and operative to partially reflect the light beam impinging thereon from light display 130 (i.e., an image source), and partially transmit incoming light from an outward translucent view in the ambient environment (i.e., a scene). Partially transmissive partially reflective lens 108 effectively functions as a light combiner, such that light from the image source and light from the outward scene are combined to form a combined image (not shown) that is directed and provided to at least one eye of the user. Additionally, partially transmissive partially reflective lens 108 is an ophthalmic lens configured and operative to provide ophthalmic (vision) correction to user 10. Essentially, each partially transmissive partially reflective lens 108R and 108L is a corrective lens used to improve vision of the user (e.g., by correcting for refractive errors of the user's eye(s) 18R, 18L (respectively) such as myopia, hyperopia, presbyopia, and the like). Furthermore, both partially transmissive partially reflective lenses 108L and 108R for both the user's left and right eyes 18L and 18R are adapted to match the interpupillary distance (IPD) of that user. As such, partially transmissive partially reflective lens 108 is typically constructed from rigid, durable, lens-grade materials such as glass (e.g., optical crown glass), polycarbonate, and the like, as well as at least one reflective optical coating layer whose thickness (at least to some degree) determines its reflective characteristics. The ratio of reflection to transmission, which is typically dependent on the wavelength of light incident on partially transmissive partially reflective lens 108, may vary. Typical reflection percentages typically lie between 20-40%; whereas typical total transmission percentages lie between 8-70%. Any ratio derived from these percentages is viable. In particular, there may be more than one reflection to transmission ratios of partially transmissive partially reflective lens 108 (which may be different or the same). One reflection to transmission ratio is associated with light impinging on inner surface 160 (produced by light display 130), the other associated with light impinging on outer surface 162. According to one realization, the reflectivity of outer surface 162 may be greater than the reflectivity of inner surface 160. Other, different realizations may be possible, for example, where outer surface 162 (i.e., and/or at least part of partially transmissive partially reflective lens 108) may be embedded with silver halide (silver salts) in microcrystalline form that endow photochromic properties to the lens. The following features and options may apply differently or equally to each partially transmissive partially reflective lens 108R and 108L. Optionally, an antireflection coating may also be applied to outer surface 162. Further optionally, an anti-abrasion coating may also be applied to partially transmissive partially reflective lens 108. Further optionally, an anti-fog coating may be applied to partially transmissive partially reflective lens 108. Further optionally, partially transmissive partially reflective lens 108 may be coated and/or incorporate light-polarized material, which generally enhances the contrast of an image viewed through the lens (e.g., especially noticeable in snow covered environments). Partially transmissive partially reflective lens 108 may employ shatter resistant ("shatterproof") materials (e.g., polyvinyl butyral (PVB), ethylene-vinyl acetate (EVA), thermoplastic polyurethane (TPU), polyethylene terephthalate (PET), polycarbonate (PC), combinations thereof, etc.) in its construction and/or manufacture such that it exhibits shatterproof and impact-resistant qualities. Moreover, partially transmissive partially reflective lens 108 complies with known safety standards of eyewear in general, and eyewear (e.g., sunglasses) used for sporting applications, in particular.

Partially transmissive partially reflective lens 108 reflects the light beam from first lens 140, passing through light display pupil 156 and toward the eye of the user, where dotted-line 164 represents a position of a plane that indicates the front eye surface of eye (18R, 18L) of user. Dotted-line 164 is disposed along the optical path between partially transmissive partially reflective lens 108 and light display pupil 156. As will be described in greater detail hereinbelow, OST NED system 100 incorporates a pupil forming optical design thereby enabling a favorable visual experience for viewing the light image emitted by light display 130 across a wide FOV.

Figure 6B:
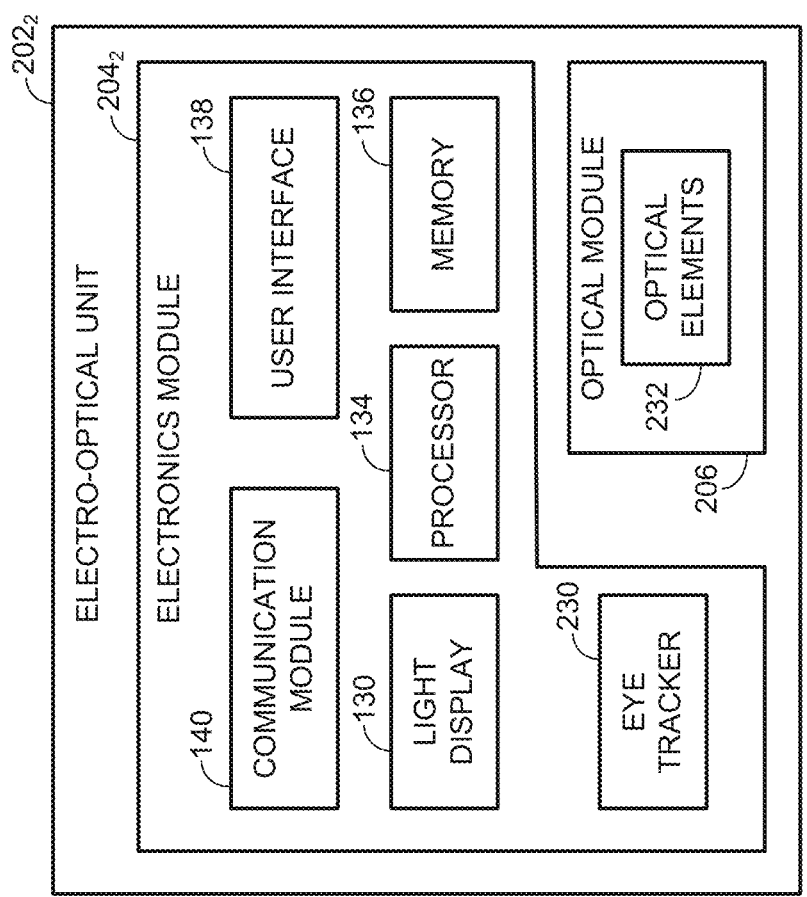
FIG. 6B is a schematic block diagram of an accessorized configuration of an electro-optical unit of OST eye-tracking system, constructed and operative in accordance with the embodiment of the disclosed technique.
Figure 6A:
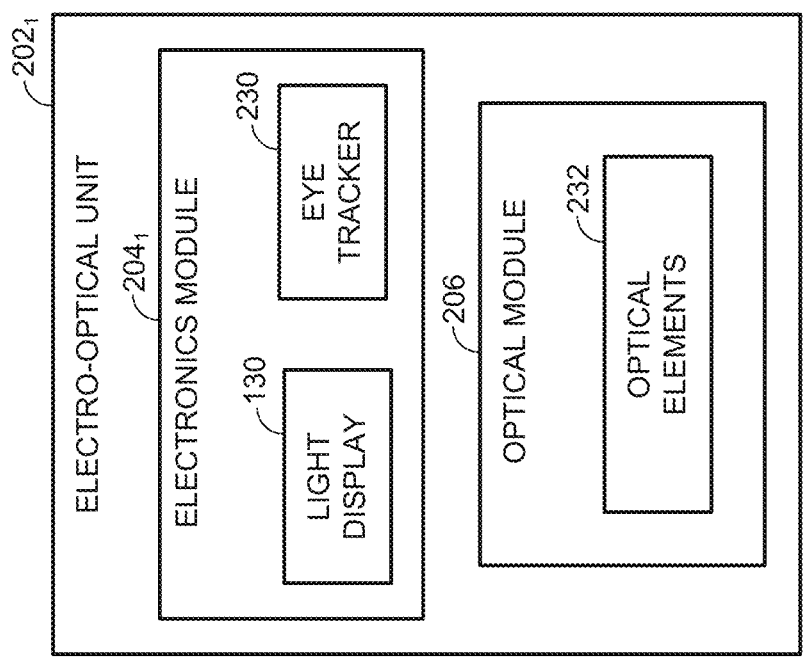
FIG. 6A is a schematic block diagram of a basic configuration of an electro-optical unit of OST eye-tracking system, constructed and operative in accordance with another embodiment of the disclosed technique.
Figure 7:
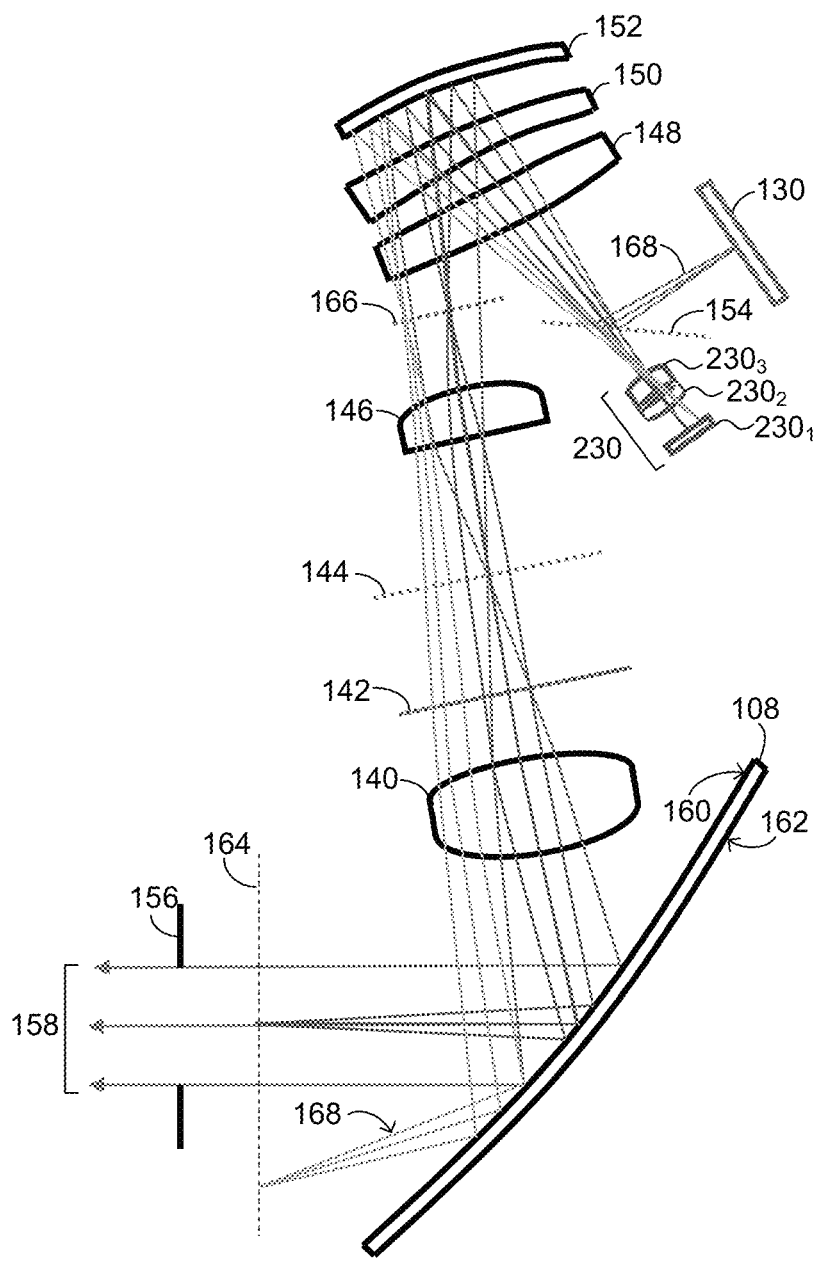
FIG. 7 is a schematic diagram of a light path through an optical module of electro-optical unit of OST eye-tracking system, constructed and operative in accordance with the embodiment of the disclosed technique.

According to another embodiment of the disclosed technique, OST NED system 100 is configured and operative with an eye-tracking system. As such there is thus provided an optical configuration for an OST eye-tracking system that includes partially transmissive partially reflective lens (combiner) and an electro-optical unit that includes an image sensor, configured to acquire at least one image of an eyeball feature of an eye of the user, with reflected light from the eye. To further elucidate the particulars of this embodiment of the disclosed technique, reference is now made to FIGS. 6A, 6B, and 7. FIG. 6A is a schematic block diagram of a basic configuration of an electro-optical unit of OST eye-tracking system, generally referenced 200, constructed and operative in accordance with another embodiment of the disclosed technique. FIG. 6B is a schematic block diagram of an accessorized configuration of an electro-optical unit of OST eye-tracking system, constructed and operative in accordance with the embodiment of the disclosed technique. FIG. 7 is a schematic diagram of a light path through an optical module of electro-optical unit of OST eye-tracking system, constructed and operative in accordance with the embodiment of the disclosed technique.

OST eye-tracking system 200 (herein denoted interchangeably as "OST NED eye-tracking system) generally incorporates similar features and components of OST NED system 100, however, OST NED eye-tracking system 200 includes an electro-optical unit that employs an eye-tracker as detailed below. FIG. 6A illustrates a basic configuration of an electro-optical unit of OST NED eye-tracking system 200, denoted by $202_1$. Electro-optical unit $202_1$ includes an electronics module $204_1$, an optical module 206, and eye tracker 230. Particularly, electronics module $204_1$ includes a light display 130, and eye-tracker 230. Note that identically referenced numbers in the embodiments OST NED system 100 and OST NED eye-tracking system 200 relate to the same components (i.e., same type and function). (For example, light display 130 in OST NED system 100 shown in FIG. 3A is identical to light display 130 in OST NED eye-tracking system 200, shown in FIG. 6A.) Optical module 206 includes optical elements, collectively referenced 232 that are particularized in greater detail in FIG. 7. Light display 130 of electronics module $204_1$ along with optical elements 232 of optical module 206 form a light projector that is configured and operative to produce, irradiate, and project a light beam image (not shown) onto at least one partially transmissive partially reflective lens 108 (i.e., at least one of 108R and 108L), in a similar manner described hereinabove with respect to OST NED system 100. Optical elements 232 are configured and operative to convey and project the image produced by light display 130 onto partially transmissive partially reflective lens 108.

FIG. 6B illustrates an accessorized configuration of electro-optical unit 102 of OST NED eye-tracking system 200, denoted by $202_2$, having additional components with respect to the basic configuration of electro-optical unit configuration $202_1$, shown in FIG. 6A. Electro-optical unit $202_2$ includes an electronics module $204_2$ and optical module 206 (i.e., identical to that in FIG. 6A). According to the accessorized configuration, electronics module $204_2$ includes light display 130, an eye-tracker 230 (i.e., identical to that in FIG. 6A), and may optionally include at least one of a processor 134, a memory device 136, a user interface 138, and a communication module 140. Processor 134, memory device 136, user interface 138, and communication module 140 are identical to those shown in FIG. 3B, except for added configuration, functionality, and features (e.g., software) associated with eye-tracker 230. Optical elements (components) 232 (FIGS. 6A and 6B) of optical module 206 are further described in greater detail in conjunction with FIG. 7.

With particular reference now to FIG. 7, which is an illustration showing a schematic diagram of two light paths through optical module 206 of electro-optical unit 202 of OST NED eye-tracking system 200. Eye tracker 230 typically includes several components, which include an image sensor $230_1$ and two lenses $230_2$, $230_2$, as shown in FIG. 7. Image sensor $230_1$ is part of electronics module $204_1$ of electro-optical units $202_1$ and $202_2$, and lenses $230_2$ and $230_2$ are part of optical elements 232 of optical module 206 of electro-optical units $202_1$ and $202_2$ (with reference to FIGS. 6A and 6B). For both basic and accessorized configurations, eye-tracker 230 may further optionally include at least one light source (not shown) that is configured and operative to illuminate at least one eye of the user, thereby facilitating in tracking the eye position (e.g., gazing direction, from eyeball features such as the pupil, as known in the art). All other components shown in FIG. 7 having the same reference numbers as those shown in FIG. 5 are identical to each other. In that respect OST NED eye-tracking system 200 is similar to OST NED system 100. FIG. 7 illustrates two light ray bundles (beams) 158 and 168 propagating along two different light paths. Light rays 158 represent an optical path of light display 130, while light rays 168 represent an optical path associated with eye-tracker 230.

Specifically, electro-optical unit 202 (i.e., $202_1$ and $202_2$) includes light display 130, and optical elements 232 of optical module 206 that include first lens 140, reflector 142, second lens 146, third lens 148, fourth lens 150, curved mirror 152, partially transmissive partially reflective element 154, and lenses $230_2$ and $230_3$ of eye-tracker 230. FIG. 7 further shows partially transmissive partially reflective lens 108, and aperture 156 (herein denoted interchangeably as "light display exit pupil"), and an intermediate image of light display (not shown) that forms at an intermediate image plane 144 between first lens 140 and second lens 146, as well as intermediate image of eye-tracker (not shown) that forms at an intermediate image plane 166 between third lens 148 and second lens 146. Partially transmissive partially reflective lens 108 is the same as described in conjunction with FIG. 5 (i.e., it includes inner surface 160 and outer surface 162, whereby inner surface 160 is characterized by an inner surface radius of curvature $r_i$ exhibiting a first optical power $P_i$ and outer surface 162 is characterized by an outer surface radius of curvature $r_o$ exhibiting a first optical power $P_o$.)

Optical elements 232 of optical module 206, light display 130 of electronics modules $204_1$ and $204_2$, and partially transmissive partially reflective lens 108 form an optical arrangement (herein interchangeably "optical configuration") allowing light rays to propagate along two light beams 158 and 168, as illustrated in FIG. 7. Reflected light from the eye (i.e., front eye surface (dotted-line 164) of the user (i.e., natural (ambient) light, or artificial light (from a dedicated light source), or both) reflects off the eyeball of the user and that light is made to traverse an optical path that travels such that at least partially reflects from partially transmissive partially reflective lens 108; then refracts through first lens 140, second lens 146, third lens 148, and fourth lens 150, then reflects from curved mirror 152 and refracts again in reverse order through fourth lens 150 and then through third lens 148, then at least partially passing through partially transmissive partially reflective element (optical combiner) 154, refracts through lenses 230₂ and 230₃, and impinges on the image sensor 230₁. Image sensor 230₁ is configured and operative to acquire an image (not shown) of the eyeball (i.e., having at least one eyeball feature such as the pupil), to produce image data corresponding the acquired image, and to communicate the image data to processor 134 for processing.

The optical configuration enables light display 130 to project a light beam image (not shown) onto partially transmissive partially reflective lens 108 (i.e., at least one of 108R and 108L) along the optical path represented by light rays 158 (as described in hereinabove in conjunction with FIG. 5) simultaneously while eye-tracker 230 tracks the eye of the user along the optical path represented by light rays 168. Partially transmissive partially reflective element 154 (combiner) functions both as a fold mirror as well as a cold mirror that is configured and operative to reflect at least one range of wavelengths of light in electro-magnetic (EM) spectrum (i.e., typically visible light from produced by light display 130), while transmitting at least another range of wavelengths of light in the EM spectrum (i.e., typically infrared (IR) light captured by image sensor 230₁. Combiner 154 exhibits optical characteristic that include being 90% transmissive at a wavelength of 850 nm (nanometers), as well as being 90% reflective between the wavelength range of 450-650 nm. Optional flood lights (e.g., IR light-emitting diodes (LEDs)) may be used to illuminate the eye of the user thus enabling image sensor 230₁ to detect IR light reflecting off the eye. When illuminating the eye of user with IR light the user's pupil appears as a "dark pupil" facilitates detection and determination of eye pupil position (e.g., gaze direction) of the user. Image sensor 230₁ may be optimized to detect IR light at 850 nm, and may typically be based on a complementary metal-oxide-semiconductor (CMOS) technology, charge-coupled device (CCD) technology, and the like. Additional characteristics of image sensor 230₁ include it being of small size on the order of a few millimeters and incorporating global shutter and a sampling rate of 120 Hz, and a typical FOV of 50 degrees. Lenses 230₂ and 230₂ are typically embodied as aspheric lenses and configured and operative to focus light from eye front surface (represented by dotted line 164) to image sensor 230₁.

OST NED eye-tracking system 200 enables an eye coverage area of approximately, 20×20 mm, and gaze coverage of +35 degrees (left and right), an eye box of 7×3 mm that is adapted to different IPDs. OST NED eye-tracking system 200, and particularly processor 134 based on image data acquired from image sensor 230₁, are configured and operative to detect blinking of the eye of the user, gaze orientation tracking, user-interface interaction, IPD adjustment, line-of-sight (LOS) stabilization, focus distance estimation, near field AR auto-correction for parallax (i.e., eye-camera-LOS), as well as fatigue detection.

Figure 8A:
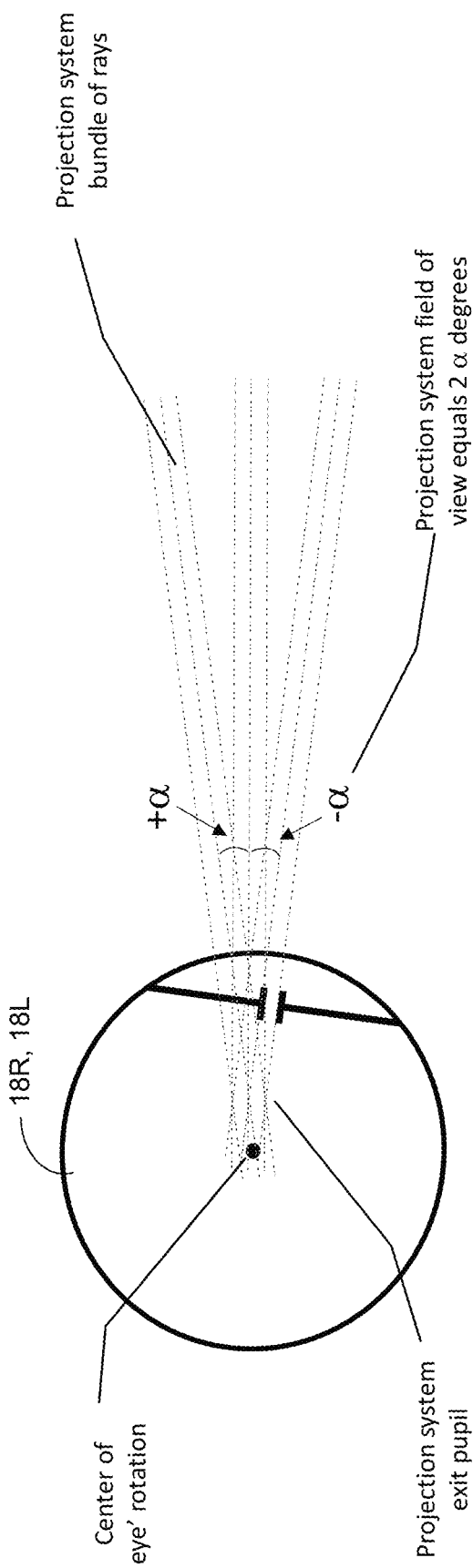
FIG. 8A is a schematic illustration showing the principles of the pupil forming optical design upon which OST NED system 100 and OST NED eye-tracking system 200 are based, in accordance with the embodiments of the disclosed technique.
Figure 8B:
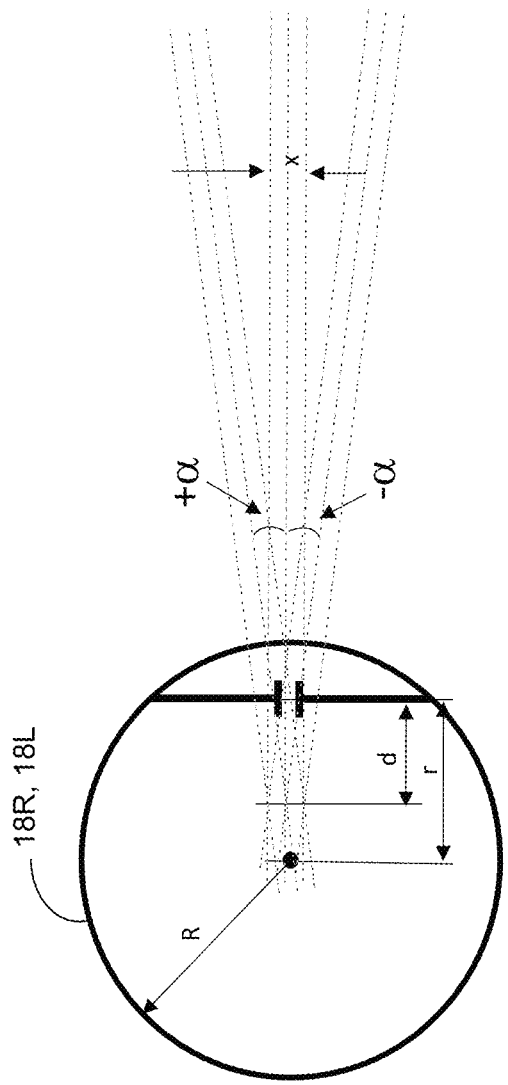
FIG. 8B is a schematic illustration showing the a simplified geometric representation of a human eye, looking at a projected image focused at a far distance, and generated by a forming exit pupil display system design upon which OST NED system 100 and OST NED eye-tracking system 200 are based, in accordance with the embodiments of the disclosed technique.
Figure 8C:
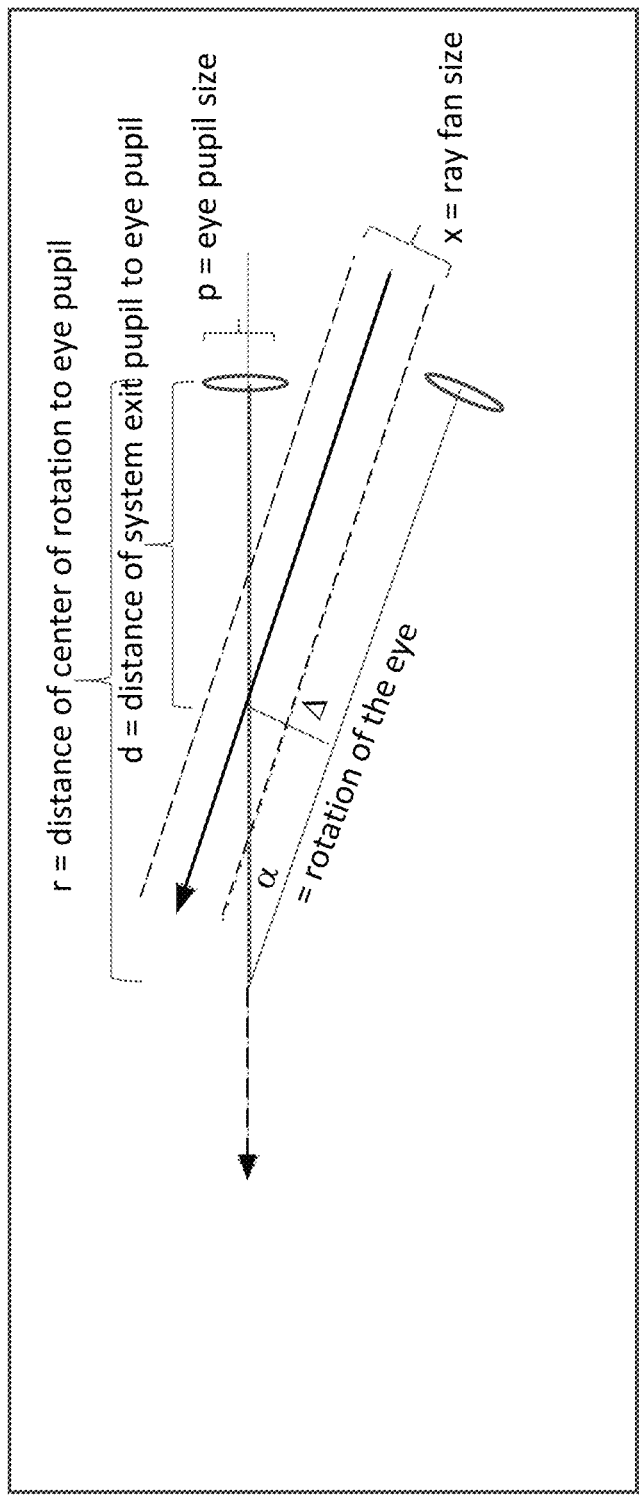
FIG. 8C is a schematic illustration showing determination of the distance, d, of the system exit pupil to the eye pupil, according to the disclosed technique.

Reference is now made to FIGS. 8A, 8B, and 8C. FIG. 8A is a schematic illustration showing the principles of the pupil forming optical design upon which OST NED system 100 and OST NED eye-tracking system 200 are based, in accordance with the embodiments of the disclosed technique. FIG. 8B is a schematic illustration showing the a simplified geometric representation of a human eye, looking at a projected image focused at a far distance, and generated by a forming exit pupil display system design upon which OST NED system 100 and OST NED eye-tracking system 200 are based, in accordance with the embodiments of the disclosed technique. FIG. 8C is a schematic illustration showing determination of the distance, d, of the system exit pupil to the eye pupil, according to the disclosed technique.

FIG. 8A shows a simplified geometric representation of a human eye (18R, 18L) that is gazing at a projected image focused at a far distance generated by a non-pupil forming exit display system, in accordance with the principles of the disclosed technique. As eye 18R,L of user looks to one side of the FOV at an angle α (degrees), and accordingly a portion of a ray penetrate the eye' pupil. At the center of the FOV near to eye projection system, the user will be expected to see the whole image of the display (e.g. the center of the field with the central vision, and the sides of the field with the peripheral vision). Further, while looking to the sides of the FOV of a near to eye projection system, the user is expected to clearly see the side of the field with the central vision, and the rest of the field with the peripheral vision. From FIG. 8A it is clear that achieving that expectation for visual experience requires attention and specific design to optimize the configuration of the projection system, such that the design position of the exit pupil of the projection system is taken into account with respect to the eye pupil position, as well as with respect to the size of the pupil, the size of the bundle of rays arriving from the projection unit (from each direction across the field of view), and the total size of the field of view of the projection unit.

Referring now to FIG. 8B, FIG. 8B illustrating is a schematic illustration showing a simplified geometric representation of human eye 18R, 18L, looking at a projected image (not shown) that is focused at a far distance from a user. A user of the OST NED system 100 and OST NED eye-tracking system 200 gazes at the projected image focused at far distance, and that is generated by a non-pupil forming exit display system, in accordance with the embodiments of the disclosed technique. FIG. 8B shows a representation of three bundles of rays arriving at an angles 0, and +/−α, which are to be considered as arriving from the projection display system (light display 130). The ray bundle represents portions of the FOV of the display (e.g. the bundle of rays arriving at angle of zero degrees are originated at the center of the FOV of the display). Similarly, assuming a represents the maximal angle of view of the projection system, the bundle of rays arriving at angle of +α degrees were originated at the side of display. Furthermore, FIG. 8B includes annotations, were R represents the eye radius of rotation, r represents the distance of the eye pupil from the eye center of rotation, d represents the distance of the pupil from the eye center of rotation, and x represents the diameter of the bundle rays. When the user's eye is looking straight ahead at an angle of 0 degrees, and accordingly a portion of the bundle of rays penetrate the eye's pupil, it may be seen that portions of ray bundles arrive from angles +α and −α also penetrate the pupil. This situation represents a case were the eye is able to perceive both the center of the FOV of the display (e.g. as central vision is captured by the fovea of the eye), and the sides of the FOV of the display (e.g. known as peripheral vision).

Referring now to FIG. 8C, which shows a schematic illustration for facilitating the determination of the distance, d, of the system exit pupil to the eye pupil, according to the disclosed technique, x represents a (projected) ray bundle diameter, r represents the distance of the eye's pupil from the eye's center of rotation, p represents the pupil diameter, A represents the projected distance between the center of the pupil and the center of the optical exit pupil. The schematic illustrates two poses (positions and orientations) of the eye: (1) looking forward, and (2) looking to the side at an angle of a which is half of the FOV as shown in FIGS. 8A-C (i.e.

at the direction of the rays of light arriving from the image display). From FIG. 8C it is determined that the optimal position for the exit pupil of the projection system is according to the following formula:

$$d > r - \left(\frac{x-p}{2\sin\alpha}\right), \quad (1)$$

where d represents the distance of the exit pupil behind the eye' pupil (e.g. into the eye). At this position the whole aperture of will be covered with rays. Similarly, from FIG. 8C it is determined that while the user gazes forward, the optimal position for the exit pupil of the projection system is according to the following formula:

$$d < \frac{x + p(\cos\alpha - 2)}{2\sin\alpha}, \quad (2)$$

where d represents the distance of the exit pupil in-front of the pupil (e.g. forward to the eye). OST NED system 100 and OST NED eye-tracking system 200 with a non-pupil forming exit abiding according to equations (1) and (2) enable an optimal visual experience while watching the display across the whole FOV.

Figure 9A:
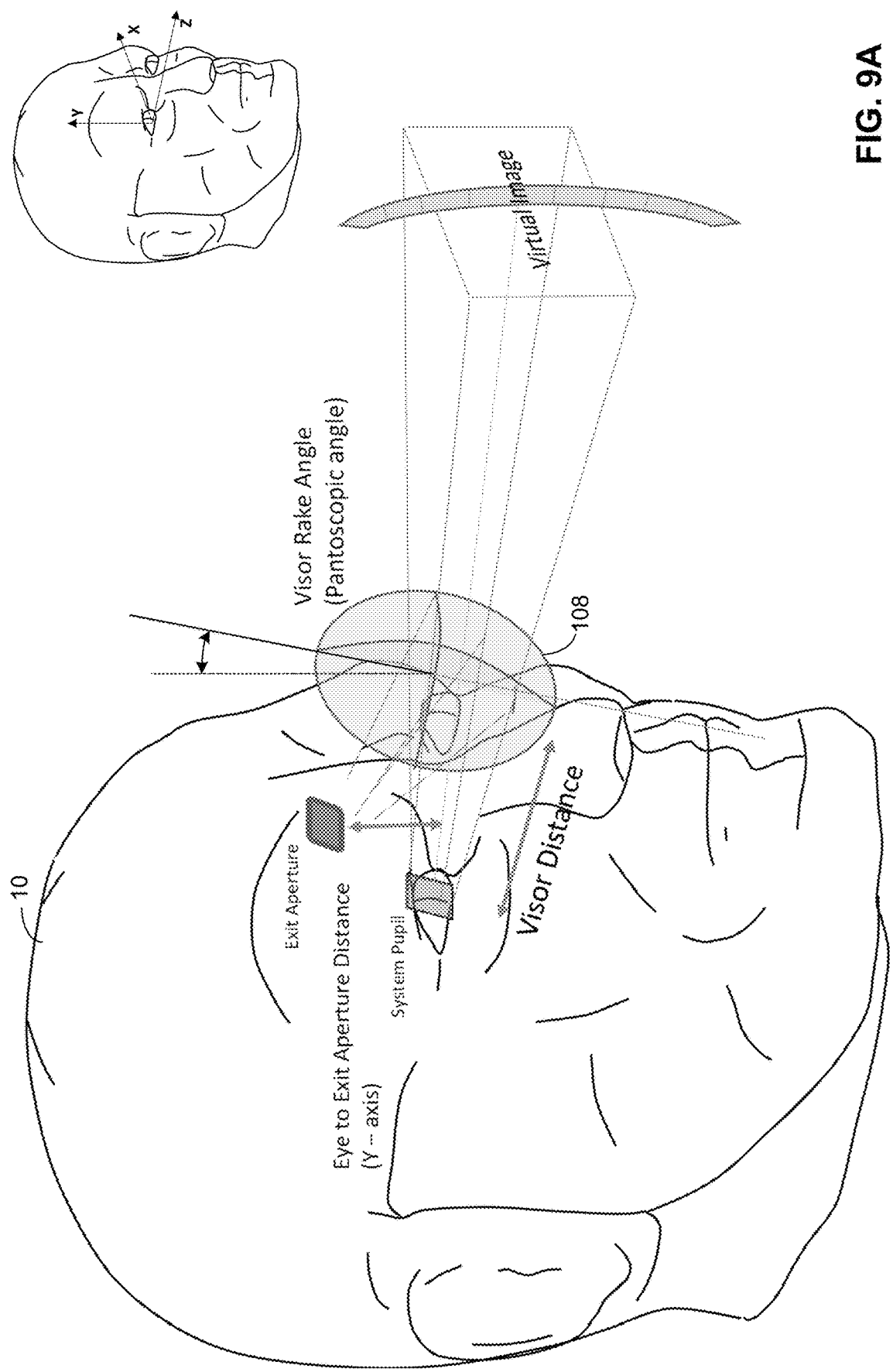
FIG. 9A is a schematic illustration showing optical design features according to the principles of the disclosed technique.

In accordance with the disclosed technique, OST NED system 100 and OST NED eye-tracking system 200 are characterized by several important features which will be described hereinbelow in greater detail. Reference is now made to FIG. 9A, which is a schematic illustration of illustrating optical design features of the systems of the disclosed technique with respect to an eye motion box in relation to an exit aperture. The center portion of FIG. 9A illustrates a simplified schematic illustration showing user 10, partially transmissive partially reflective lens 108 (interchangeably "visor", and "combiner"), an exit aperture, and a system pupil. The top right portion of FIG. 9A illustrates a coordinate system whose origin is located at the user's eye pupil position. An eye motion box is determined by the exit aperture (and eye position). The light display position and orientation (P&O) is determined by the combiner (visor) rake angle. The image angle with respect to the real-world outward scene horizon is dictated by the angle of attack and the light display P&O. The position of the eye and the eye box in conjunction with the conferred FOV to the user is dependent upon the visor distance, which in turn is determines the exit aperture size. FIG. 9A further shows the visor rake angle (pantoscopic angle).

Figure 9B:
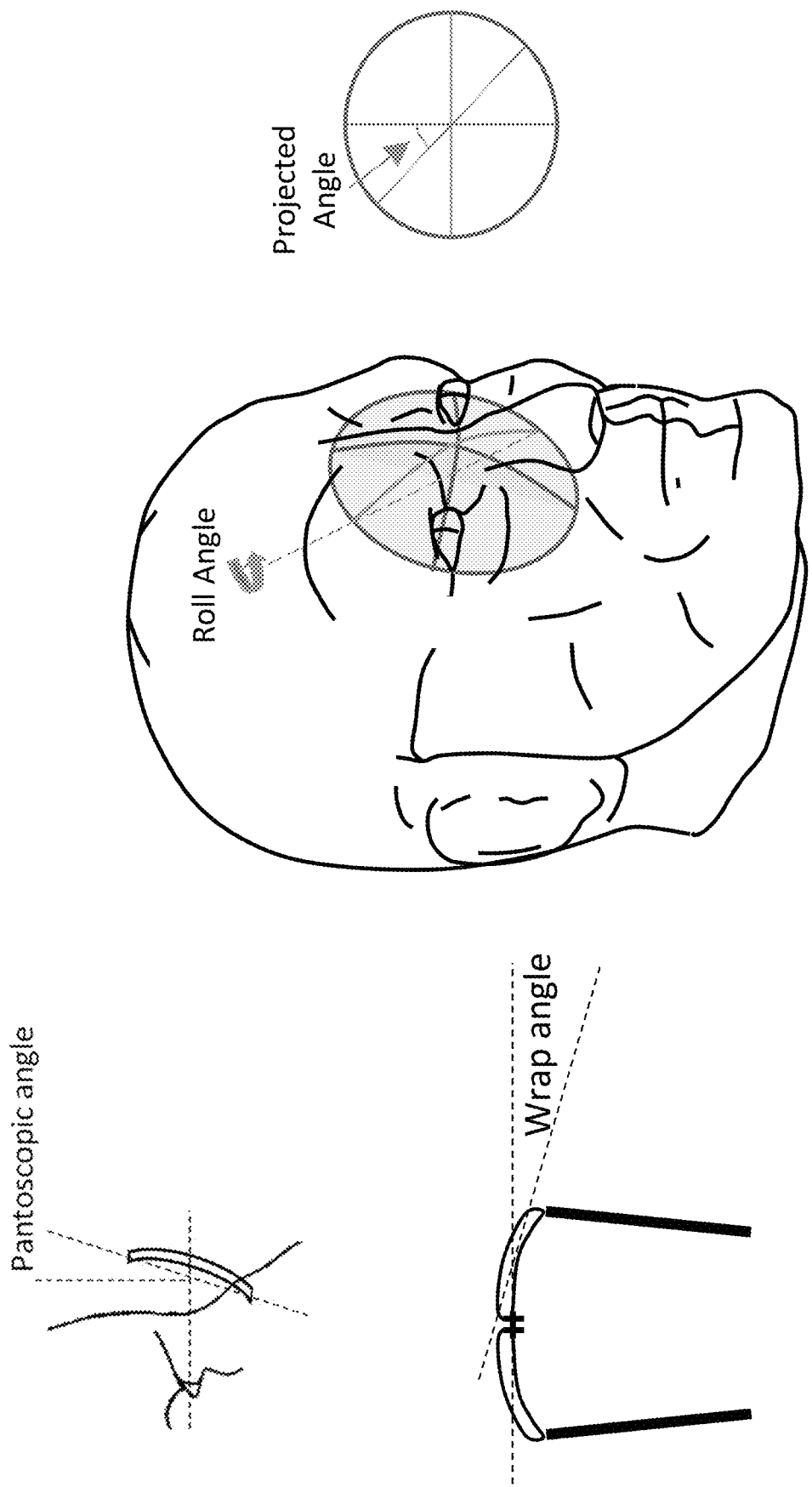
FIG. 9B is a schematic illustration showing a pantoscopic angle, a wrap angle, and a roll according to the principles of the disclosed technique.

To further explain the pantoscopic angle's relation to the disclosed technique, reference is now further made to FIG. 9B, which is a schematic illustration showing a pantoscopic angle, a wrap angle, and a roll according to the principles of the disclosed technique. The pantoscopic angle is defined as an angle between a plane of combiner 108 and the vertical y-axis, as indicated in FIG. 9A. Mathematically, the pantoscopic angle is defined as: cos(Roll)*Tilt. FIG. 9B shows a side partial view of the user, and combiner 108, where the vertical dotted line indicates the vertical axis (y-axis) and a pantoscopic angle from a plane of combiner 108 to the vertical axis. FIG. 9B further shows a wrap angle which is defined as half the angle of frame 112 to a straight line, and mathematically as sin(Roll)*Tilt. The roll angle as shown in FIG. 9B is defined as the projected exit aperture angle, as illustrated.

The characteristics described hereinabove in conjunction with FIGS. 8, 9A and 9B enable to characterize the OST NED system (and product) according to the disclosed technique exhibiting the following features, characteristics, optical design data, and tolerances:

OST NED system 100 and OST NED eye-tracking system 200 embodied as a product (apparatus) having the form of eyewear (e.g., eye glasses with ophthalmic correction) is based on free-space optics having a partially transmissive partially reflective lens 108 (i.e., combiner, visor), and an electro-optical unit (that includes light display 130);

Partially transmissive partially reflective lens 108 (combiner, visor) exhibits a pantoscopic tilt of 22 degrees. (herein abbreviated "deg." or °)±4 deg., and a wrap angle of 22 deg.±4 deg. and curvature radii of 100 mm+34 mm;

Partially transmissive partially reflective lens 108 maximal distance from the eye cornea location is 15 mm±2 mm;

Light display 130 (i.e., image projection unit) has an exit aperture, and that exit aperture has a projection angle of 45 deg.±5 deg. roll angle around the Z-axis, and 31 deg.±4 deg. tilt relative to the normal of the visor, and a distance of 6 mm±2 mm from the visor;

Light display 130 (i.e., image projection unit) exit aperture is positioned relative to the eye pupil location at a minimal distance defined with a borderline at roll angle of 45 deg.±5 deg. around Z axis positioned 14 mm±3 mm from the eye pupil center along Z axis, and a projected distance of at least 8 mm±2 mm from the eye pupil center;

Light display 130 (i.e., image projection unit) exit aperture has a field of projection 24×13±2 deg. that creates an eye box of 6×3±1 mm; and The center of the virtual image is placed at an elevation angle of 2 degrees max.±3 deg. relative to the horizon.

Figure 10A:
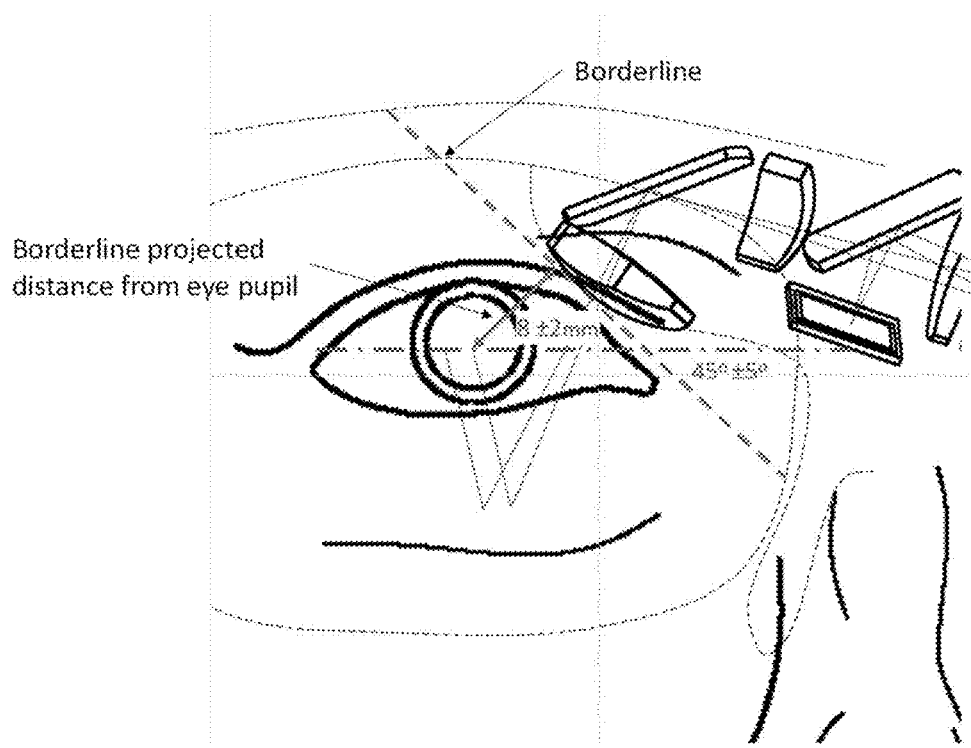
FIG. 10A is a schematic illustration showing a front-facing detailed partial view of characteristic design constraints of the systems of the disclosed technique.
Figure 10B:
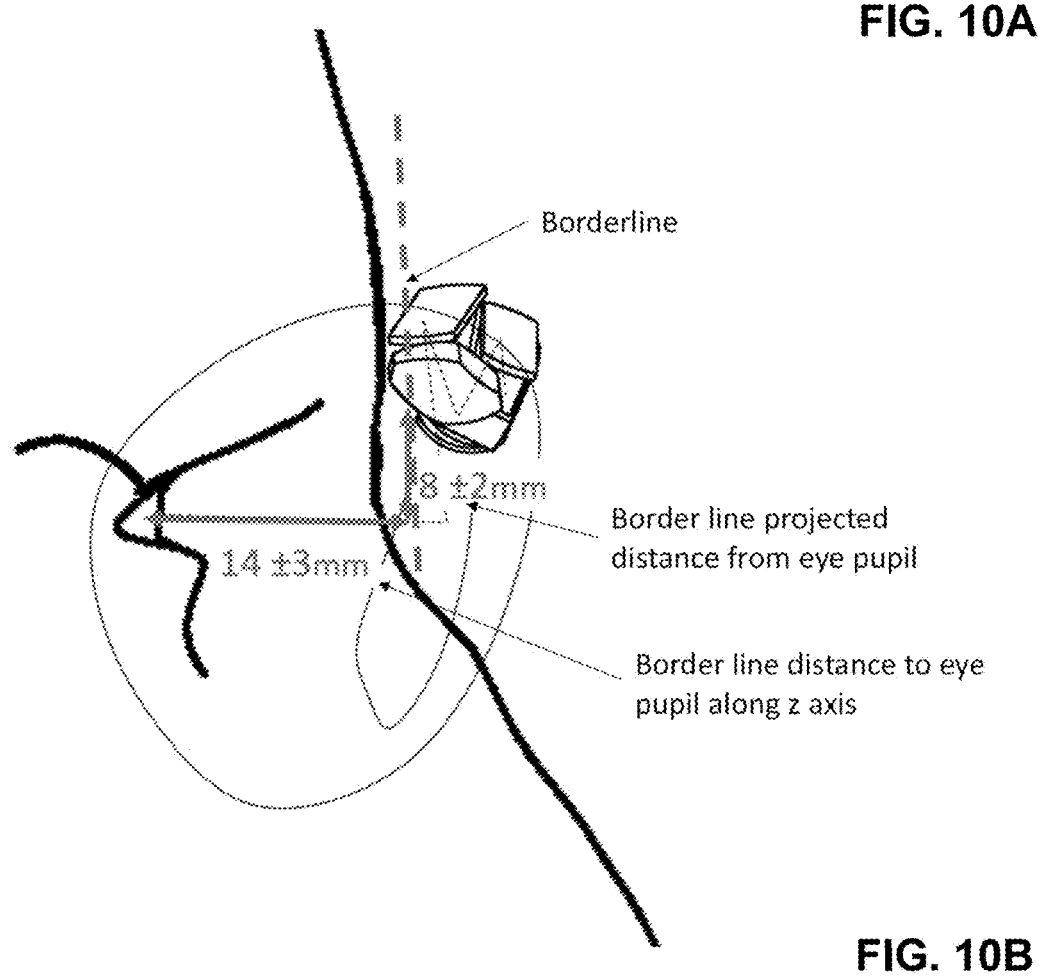
FIG. 10B is a schematic illustration showing a detailed side partial view of characteristic design constraints of the systems of the disclosed technique.

Reference is now made to FIGS. 10A and 10B. FIG. 10A is a schematic illustration showing a front-facing detailed partial view of characteristic design constraints of the systems of the disclosed technique. FIG. 10B is a schematic illustration showing a detailed side partial view of characteristic design constraints of the systems of the disclosed technique. As shown in FIG. 10A a dotted line represents a borderline of first lens 140 (FIGS. 5 and 7) with respect to eye 18R of user 10. The projected distance from the border line to the pupil of eye 18R is 8±2 mm. As shown in FIG. 10B a dotted line represents a borderline of several optical elements 132 (FIG. 5) and 232 (FIG. 7) with respect to a distance to pupil of the eye along the Z-axis (FIG. 9A).

It will be appreciated by persons skilled in the art that the disclosed technique is not limited to what has been particularly shown and described hereinabove. Rather the scope of the disclosed technique is defined only by the claims, which follow.

The invention claimed is:

1. An optical configuration for an optical see through (OST) eye tracking system, comprising:
a partially transmissive partially reflective lens, configured to be facing an eye of a user; and
an electro optical sub system, comprising:
an eye-tracker including an image sensor, configured to acquire at least one image of an eyeball feature of said eye with reflected light from said eye;
a first lens;
a second lens;
a third lens;

a fourth lens;
a curved mirror;
an optical combiner; and
a fifth lens,
wherein said optical configuration enables said reflected light to travel along an eye tracker optical path at least partially reflecting from said partially transmissive partially reflective lens; then refracting through said first lens, said second lens, said third lens, and said fourth lens, then reflecting from said curved mirror and refracting again in reverse order through said fourth lens and then through said third lens, then at least partially passing through said optical combiner, refracting through said fifth lens, and impinging on said image sensor.

2. The optical configuration according to claim 1, wherein said eye tracker further includes two lenses.

3. The optical configuration according to claim 1, wherein said eye tracker further includes at least one light source configured to illuminate said eye.

4. The optical configuration according to claim 1, further comprising a light display configured to project a light beam image.

5. The optical configuration according to claim 4, further comprising a main reflector configured to reflect said light beam image, said main reflector is positioned between said light display and said third lens.

6. The optical configuration according to claim 4, wherein said light beam image propagates along a display optical path traveling from said display then at least partially reflecting from said main reflector that reflects said light beam image toward said third lens that refracts said light beam image toward said fourth lens that refracts said light beam toward said curved mirror that reflects said light beam image back again in reverse order through said fourth lens that refracts said light beam to said third lens that refracts said light beam to said second lens that refracts said light beam image to said first lens that refracts said light beam image conveying it toward said partially transmissive partially reflective lens.

7. The optical configuration according to claim 6, further comprising a first auxiliary reflector, and a second auxiliary reflector.

8. The optical configuration according to claim 7, wherein said first auxiliary reflector is positioned along said display optical path between said first lens and said second auxiliary reflector, wherein said second auxiliary reflector is position along said display optical path between said second lens and said first auxiliary reflector.

9. The optical configuration according to claim 4, wherein said second lens is configured to form an intermediate image along said display optical path generally between said first lens and said second lens.

10. The optical configuration according to claim 7, wherein said second lens is configured to form an intermediate image along said display optical path specifically between said first auxiliary reflector and said second lens.

11. The optical configuration according to claim 4, wherein said light display is configured to receive data, generate light encoded data based on received said data, to irradiate and to project said light encoded data as said light beam image toward said partially transmissive partially reflective lens.

12. The optical configuration according to claim 1, wherein said intermediate image is an aberration-compensated image.

13. The optical configuration according to claim 1, wherein said second lens is configured to form an intermediate image along said eye tracker optical path between said second lens and said third lens.

14. The optical configuration according to claim 1, wherein said eye tracker further includes a processor for receiving image data produced by said image sensor.

15. The optical configuration according to claim 1, wherein said optical configuration enables said light display to display said light beam image onto said partially transmissive partially reflective lens along said display optical path, simultaneously while said eye tracker tracks said eye of said user along said eye tracker optical path.

16. The optical configuration according to claim 1, wherein said partially transmissive partially reflective lens is operative as a fold mirror and a cold mirror configured to reflect at least one range of wavelength of light in the electro magnetic (EM) spectrum.

17. The optical configuration according to claim 1, wherein said processor is configured to perform at least one of:
 detect blinking of said eye of said user;
 gaze orientation tracking;
 user-interface interaction;
 line of sight (LOS) stabilization;
 focus distance estimation;
 near field AR auto-correction for parallax; and
 fatigue detection.

18. The optical configuration according to claim 1, wherein said optical configuration is a free space optical design.

* * * * *